(12) United States Patent
Hossbach et al.

(10) Patent No.: US 10,655,497 B2
(45) Date of Patent: May 19, 2020

(54) TURBOCHARGER

(71) Applicant: MAN DIESEL & TURBO SE, Augsburg (DE)

(72) Inventors: Björn Hossbach, Diedorf (DE); Santiago Uhlenbrock, Gräfenberg (DE)

(73) Assignee: MAN Energy Solutions SE, Augsburg (DE)

(*) Notice: Subject to any disclaimer, the term of this patent is extended or adjusted under 35 U.S.C. 154(b) by 61 days.

(21) Appl. No.: 15/946,017

(22) Filed: Apr. 5, 2018

(65) Prior Publication Data

US 2018/0291764 A1 Oct. 11, 2018

(30) Foreign Application Priority Data

Apr. 6, 2017 (DE) .................. 10 2017 107 381

(51) Int. Cl.
| | |
|---|---|
| *F01D 25/12* | (2006.01) |
| *F01D 25/14* | (2006.01) |
| *F02B 39/00* | (2006.01) |
| *F02C 6/12* | (2006.01) |
| *F01D 9/02* | (2006.01) |

(52) U.S. Cl.
CPC .......... *F01D 25/125* (2013.01); *F01D 9/026* (2013.01); *F01D 25/14* (2013.01); *F02B 39/005* (2013.01); *F02C 6/12* (2013.01); *F05D 2220/40* (2013.01); *F05D 2240/14* (2013.01); *F05D 2240/50* (2013.01); *F05D 2260/20* (2013.01); *Y02T 10/144* (2013.01)

(58) Field of Classification Search
CPC ........ F01D 9/026; F01D 25/125; F01D 25/14; F02C 6/12; F05D 2220/40; Y02T 10/144
See application file for complete search history.

(56) References Cited

U.S. PATENT DOCUMENTS

| | | | | |
|---|---|---|---|---|
| 4,147,467 A | * | 4/1979 | Leicht | F01D 25/14 415/196 |
| 2010/0040467 A1 | * | 2/2010 | Mudel | F01D 25/243 415/214.1 |
| 2012/0014782 A1 | * | 1/2012 | Petitjean | F01D 25/14 415/170.1 |
| 2013/0323021 A1 | * | 12/2013 | Bogner | F01D 25/14 415/116 |

FOREIGN PATENT DOCUMENTS

DE   10 2013 002 605   8/2014

* cited by examiner

Primary Examiner — Audrey K Bradley
(74) Attorney, Agent, or Firm — Cozen O'Connor

(57) ABSTRACT

A turbocharger, with a turbine that includes a turbine housing, turbine inflow housing, a rotor, and a compressor, which has a compressor housing and a rotor coupled to the turbine rotor via a shaft. A bearing housing is arranged between and coupled to the turbine and the compressor housings. The turbine inflow housing has a radially inner, outer and middle walls. The inner wall delimits an exhaust gas flow duct, and a cooling channel between the outer and middle walls. The bearing housing, extends, seen in the axial direction as far as into the region of the inner wall of the turbine inflow housing. A cooling water channel in the bearing housing surrounds the inner wall of the turbine inflow housing in the axial region and the bearing housing extends as far as into the region of the radially inner wall of the turbine inflow housing, radially on the outside.

8 Claims, 3 Drawing Sheets

TURBOCHARGER

BACKGROUND OF THE INVENTION

1. Field of the Invention

The invention relates to a turbocharger.

2. Description of the Related Art

The fundamental construction of a turbocharger is known from DE 10 2013 002 605 A1. A turbocharger comprises a turbine in which a first medium is expanded. A turbocharger, furthermore, comprises a compressor in which a second medium is compressed utilising energy extracted in the turbine during the expansion of the first medium. The turbine of the turbocharger comprises a turbine housing and a turbine rotor. The compressor of the turbocharger comprises a compressor housing and a compressor rotor. Between the turbine housing of the turbine and the compressor housing of the compressor a bearing housing is positioned. The bearing housing is connected on the one side to the turbine housing and on the other side to the compressor housing. In the bearing housing, a shaft is mounted via which the turbine rotor is coupled to the compressor rotor.

From practice it is known that the turbine housing of the turbine comprises a turbine inflow housing and a turbine outflow housing, wherein the turbine inflow housing conducts the hot exhaust gas in the direction of the turbine rotor. To this end, the turbine inflow housing defines an exhaust gas flow duct via which the hot exhaust gas can be conducted to the turbine rotor. From practice it is already known to cool the turbine inflow housing namely by way of a cooling water channel introduced into the turbine inflow housing. It is known, furthermore, to cool the bearing housing namely via a cooling water channel introduced into the bearing housing.

An effective cooling of the turbocharger in the region of the turbine inflow housing and of the bearing housing while simultaneously ensuring a gas-tight connection between bearing housing and turbine inflow housing with ensuring a containment safety in the region of the turbine at the same time proves to be difficult today.

SUMMARY OF THE INVENTION

An object of the present invention is creating a new type of turbocharger.

According to one aspect of the invention, the turbine inflow housing comprises a radially inner wall, a radially outer wall and a radially middle wall, wherein the radially inner wall on a side facing away from the radially middle wall delimits an exhaust gas flow duct. Between the outer wall and a radially middle wall a cooling water channel of the turbine inflow housing is formed. Seen in the axial direction, the bearing housing extends as far as into the region of the radially inner wall of the turbine inflow housing, wherein a cooling water channel provided by the bearing housing surrounds the radially inner wall of the turbine inflow housing and thus the exhaust gas flow duct of the turbine inflow housing in the axial region, with which the bearing housing extends as far as into the region of the radially inner wall of the turbine housing, radially on the outside.

With the above features an effective cooling of the turbine inflow housing and of the bearing housing is possible on the one hand, while on the other hand turbine inflow housing and bearing housing are connected to one another in a gas-tight manner specifically while further providing a containment safety in the region of the turbine.

Preferentially, the bearing housing, seen in the axial direction, extends as far as to the axial middle of the exhaust gas flow duct into the region of the turbine inflow housing and, seen in the axial direction, in the region of the axial middle of the exhaust gas flow duct is connected to a section of the turbine inflow housing providing the radially outer wall and the radially middle wall. By moving the connection or separating point between turbine inflow housing and bearing housing into the region of the axial middle of the exhaust gas outflow duct, which is provided by the turbine inflow housing, the connection between bearing housing and turbine inflow housing is moved into a region that is less susceptible regarding temperature fluctuations, so that the gas-tightness of the connection can be improved. Furthermore, this also increases the containment safety.

According to an advantageous further development of the invention, the turbine inflow housing comprises a section providing the radially inner wall and a section providing the radially outer wall and the radially middle wall. The section providing the radially inner wall and the section providing the radially outer wall and the radially middle wall are connected at an end facing away from the bearing housing. The connection of the two sections of the turbine inflow housing is moved into a region that is insensitive to temperature fluctuations.

According to an advantageous further development of the invention, the cooling water channel provided by the bearing housing comprises a cooling water section surrounding the radially inner wall of the turbine inflow housing radially on the outside and a second cooling water section facing the compressor housing, wherein the first cooling water section and the second cooling water section are each formed annularly circumferentially in the circumferential direction, and wherein the first cooling water channel section and the second cooling water channel section are coupled via cooling water-conducting ribs of the bearing housing, which preferentially starting out from the first cooling water channel section converge in the direction of the second cooling water channel section.

By way of this, both an effective cooling of the turbine inflow housing and also an effective cooling of the compressor housing can be provided via the cooling water channel of the bearing housing. The ribs converging in the direction of the second cooling water channel section counteract a formation of air bubbles and thus increase the effectiveness of the cooling. Furthermore, an oil drain bore, that may be required, can be introduced into the bearing housing in any circumferential position so that the housing can be installed in the region of an internal combustion engine in any circumferential orientation. The turbine inflow housing can also be installed or mounted on the internal combustion engine together with the bearing housing in any circumferential orientation.

According to an advantageous further development of the invention, an installation element for the turbine housing is fastened to the radially outer wall of the turbine inflow housing delimiting the cooling water channel of the turbine inflow housing. Preferentially an installation element for the bearing housing is fastened to a radially outer wall of the bearing housing delimiting the cooling water channel of the bearing housing. The installation elements in the region of the turbine inflow housing and of the bearing housing ensure or promote the assembly of bearing housing and turbine inflow housing in any circumferential orientation on the internal combustion engine. An inlet flange of the turbine inflow housing can be freely rotated into any position through the freely selectable circumferential orientation of turbine inflow housing and bearing housing. Bearing housing and turbine inflow housing can be assembled in freely selectable orientation based on a 360° circumferential extent.

An oil drain to be introduced into the bearing housing is dependent on the desired orientation of the bearing housing, wherein however the oil drain, because of the configuration of the cooling water channel of the bearing housing described above, can be introduced into the bearing housing in any circumferential position.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

Figure 1:
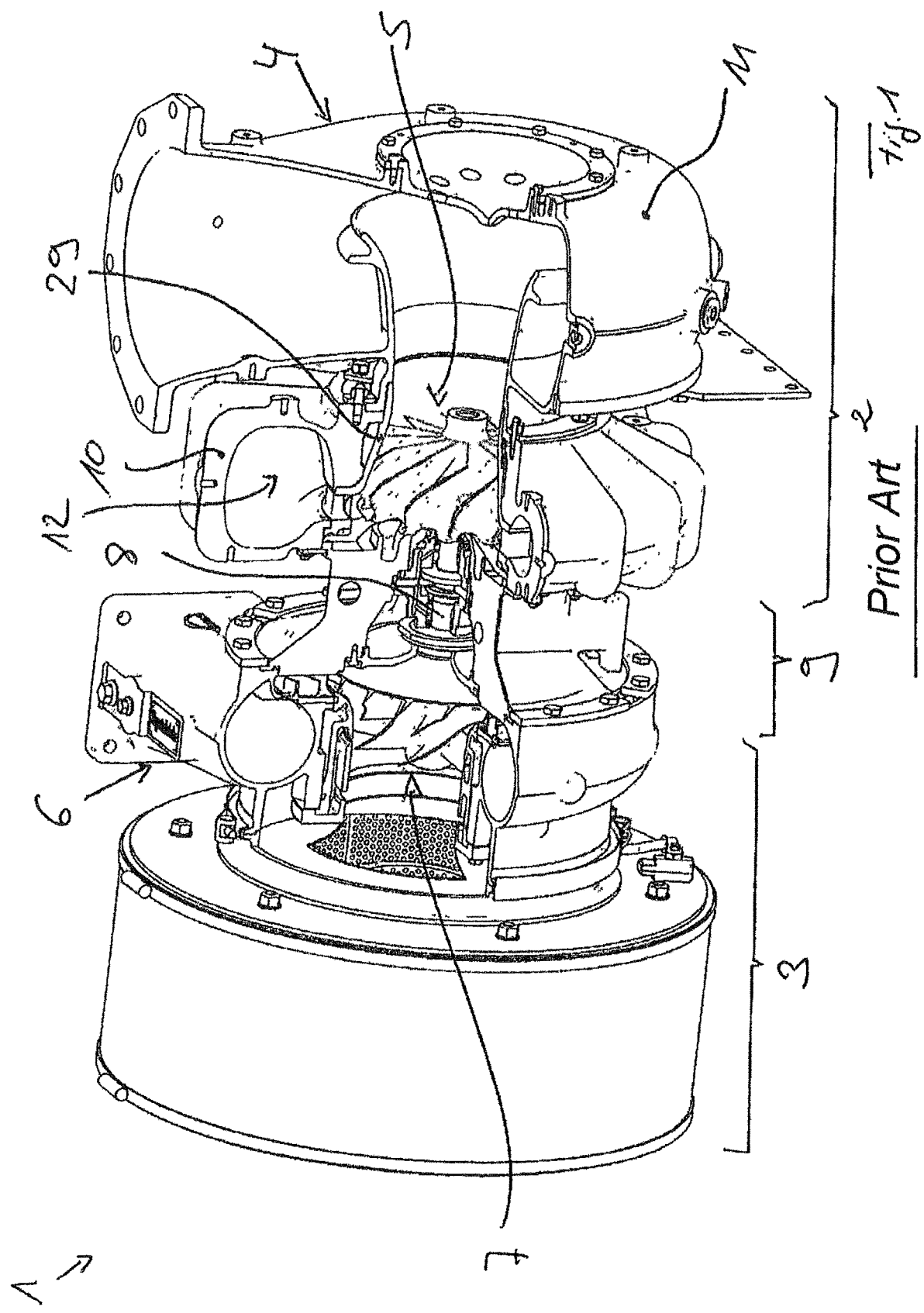
FIG. 1 is a cross section through a turbocharger according to the prior art.

The invention relates to a turbocharger.

A turbocharger 1 comprises a turbine 2 for expanding a first medium, in particular for expanding exhaust gas of an internal combustion engine. Furthermore, the turbocharger comprises a compressor 3 for compressing a second medium, in particular charge air, namely utilising energy extracted in the turbine 2 during the expansion of the first medium.

The turbine 2 comprises a turbine housing 4 and a turbine rotor 5. The compressor 3 comprises a compressor housing 6 and a compressor rotor 7. The compressor rotor 7 is coupled to the turbine rotor 5 via a shaft 8 mounted in a bearing housing 9. The bearing housing 9 is positioned between the turbine housing 4 and the compressor housing 5 and is connected both to the turbine housing 4 and the compressor housing 5.

The turbine housing 4 of the turbine 2 of the turbocharger 1 comprises a turbine inflow housing 10 and a turbine outflow housing 11. The turbine inflow housing 10 defines an exhaust gas flow duct 12, via which hot exhaust gas can be conducted to the turbine rotor 5. Starting out from the turbine rotor 5, the exhaust gas expanded in the region of the turbine rotor 5 can then be discharged from the turbine 2 via an insert piece 29 and the turbine outflow housing 4.

Figure 2:
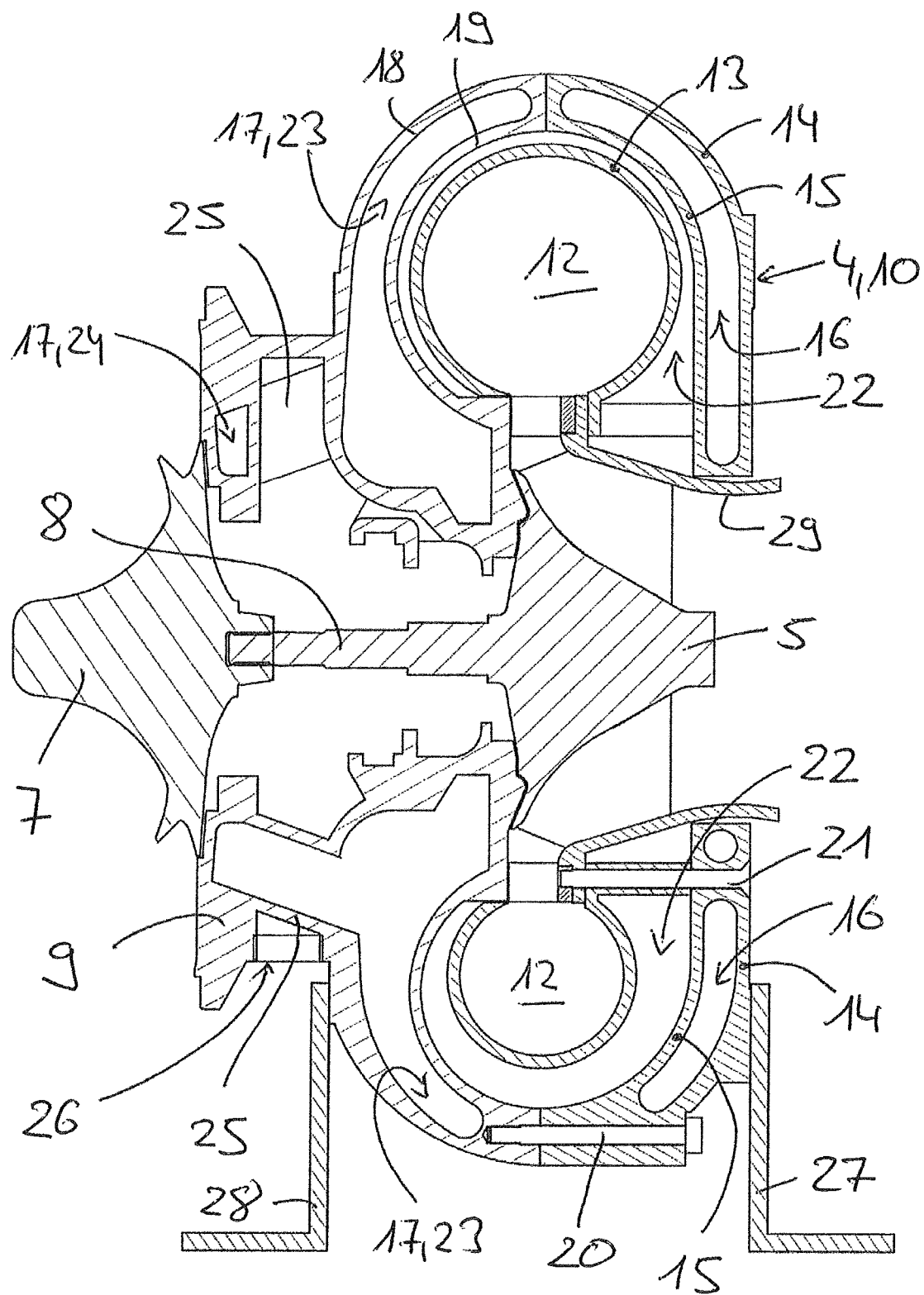
FIG. 2 is a cross section through a turbocharger according to one aspect of the invention in the region of a bearing housing and of a turbine inflow housing.
Figure 3:
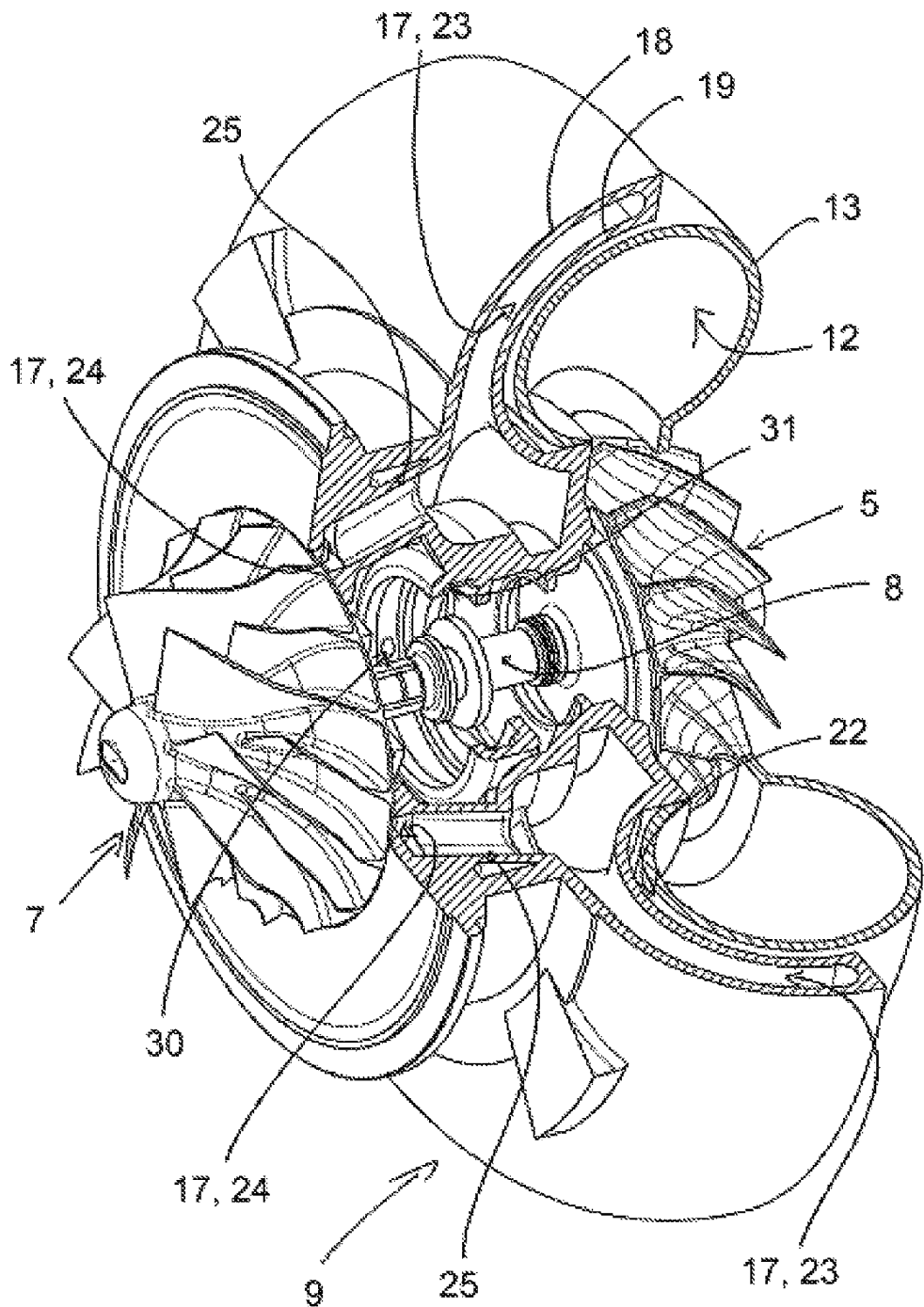
FIG. 3 are details of FIG. 2 in perspective view with partly removed turbine inflow housing.

FIGS. 2 and 3 show details of a turbocharger 1 according to one aspect of the invention in the region of the bearing housing 9 and of the turbine inflow housing 10 of the turbine housing 4. Furthermore, FIGS. 2 and 3 show the turbine rotor 5 and the compressor rotor 7, which are connected or coupled to one another via the shaft 8.

The turbine inflow housing 10 of the turbine housing 4 comprises a radially inner wall 13, a radially outer wall 14 and a radially middle wall 15. Accordingly, the turbine inflow housing 10 of the turbine housing 4 is embodied in an at least three-walled manner.

The radially inner wall 13 of the turbine inflow housing 10 delimits the exhaust gas flow duct 12 on a side facing away from the radially middle wall 15. Between the radially outer wall 14 and the middle wall 15 of the turbine inflow housing 10 a cooling water channel 16 of the turbine inflow housing 10 is formed, which surrounds the exhaust gas flow duct 12 on an axial side radially on the outside, namely on the side facing away from the bearing housing 9.

The bearing housing 9 extends, seen in the axial direction, as far as into the region of the radially inner wall 13 of the turbine inflow housing 10, preferentially as shown in FIGS. 2, 3, seen in the axial direction, as far as to the axial middle of the exhaust gas flow duct 12 delimited by the radially inner wall 13 of the turbine inflow housing 10.

A cooling water channel 17 provided by the bearing housing 9, which is defined by a radially outer wall 18 and a radially inner wall 19 of the bearing housing 9, surrounds the radially inner wall 13 of the turbine inflow housing 10 in that axial region, with which the bearing housing 9 extends as far as into the region of the radially inner wall 13 of the turbine inflow housing 10, i.e. seen in the axial direction as far as to the axial middle of the exhaust gas flow duct 12, radially on the outside.

In that region seen in the axial direction, the bearing housing 9 extends into the region of the turbine inflow housing 10, namely into the region of the radially inner wall 13 of the turbine inflow housing 10, the radially inner wall 19 of the bearing housing 9 is positioned between the radially outer wall 8 of the bearing housing 9 and the radially inner wall 13 of the turbine inflow housing 10.

The bearing housing 9 is connected to that section of the turbine inflow housing 10, which, forming the cooling water channel 16, provides the radially outer wall 14 and the radially middle wall 15, namely via fastening means 20 shown in FIG. 2.

The turbine inflow housing 10 of the turbine housing 4 of the turbine 2 accordingly comprises at least two sections. A first section provides the radially inner wall 13 and a second section comprises the radially outer wall 14 and the radially middle wall 15. The section of the turbine inflow housing 10 comprising the radially inner wall 13 is connected to the section of the turbine inflow housing 10 providing the radially outer wall 14 and the radially middle wall 15, namely on a side facing away from the bearing housing 9 or at an end facing away from the bearing housing 9 via fastening elements 21 shown in FIG. 2.

The fastening elements 21, via which the section of the turbine inflow housing 10 providing the radially inner wall 13 is connected to the section of the turbine inflow housing 10 providing the radially outer wall 14 and the radially middle wall 15, also serve for assembling the insert piece 21 on the section of the turbine inflow housing 10 providing the radially inner wall 13.

As already explained, the axial extent of that section of the turbine inflow housing 10, which provides the radially outer wall 14 and the radially middle wall 15, is smaller than the axial extent of that section of the turbine inflow housing 10, which provides the radially inner wall 13 so that the section of the turbine inflow housing 10, which provides the radially outer wall 14 and the radially middle wall 15, surrounds that section of the turbine inflow housing 10, which provides the radially inner wall 13, only in an axial region radially on the outside, namely in a region facing away from the bearing housing.

In the axial region facing the bearing housing 9 following thereon the bearing housing 9, with the walls 18 and 19 providing the cooling water channel 17, surrounds the radially inner wall 13 of the turbine inflow housing 10 radially on the outside.

Between the radially inner wall 13 of the turbine inflow housing 10, the radially middle wall 15 of the turbine inflow housing 10 and the radially inner wall 19 of the bearing housing 9, which adjoining the radially middle wall 15 of the turbine inflow housing 10, adjoins the radially inner wall 13 of the turbine inflow housing 10, a hollow space 22 is formed which although supplied with exhaust gas, does not however serve for conducting the exhaust gas flow in the direction of the turbine rotor.

The cooling water channel 17 provided by the bearing housing 9 comprises a first cooling water channel section 23 surrounding the radially inner wall 13 of the turbine inflow housing 10 radially on the outside in a defined axial region and a second cooling water channel 24 facing the compressor 3 or the compressor housing 6. These two cooling water channels 23 and 24 of the cooling water channel 17 of the bearing housing 9 are formed circumferentially in the circumferential direction or annularly circumferentially in the circumferential direction, wherein these two cooling water channels 23, 24 of the bearing housing 9 are coupled to one another in multiple circumferential positions via cooling water-conducting ribs 25. Accordingly, three, four or five such cooling water-conducting ribs 25 can be distributed over the circumference of the bearing housing 9, via which the two cooling water channels 23 and 24 of the bearing housing 9 are coupled. There can be any number of these cooling water-conducting ribs 25.

The cooling water-conducting ribs 25 are constructed such that, starting out from the first cooling water channel 23 of the bearing housing, which serves for cooling the turbine inflow housing 10, converge in the direction of the second cooling water section 24, which serves for cooling the compressor housing 6. Because of this, an air bubble formation in the region of the cooling water channel 17 is counteracted so that an effective cooling with the help of the bearing housing 9 can take place in the region of the compressor housing 6 or compressor rotor 7 and of the turbine inflow housing 10 or turbine rotor 5.

The above configuration of bearing housing 9 and turbine inflow housing 10 provides an effective cooling and a containment safety in the region of the turbine 2 is also increased. Since the connection point between bearing housing 9 and turbine inflow housing 10 is moved to radially on the outside in approximately into the region of the axially middle of the exhaust gas flow duct 12, there is no risk of a thermally induced undesirable relative shift between turbine inflow housing 10 and bearing housing 9. The connection between bearing housing 9 and turbine inflow housing 10 accordingly is gas-tight.

Furthermore, because of the above configuration of bearing housing 9 and turbine inflow housing 10, the bearing housing 9 and the turbine inflow housing 10 can be installed in the region of an internal combustion engine in any circumferential orientation, i.e. in any orientation based on a 360° circumferential extent of bearing housing 9 and turbine inflow housing 10. In particular because of the embodiment of the cooling water-conducting ribs 25 of the bearing housing 9 described above, an oil drain 26 can be introduced in the same in any circumferential position of the bearing housing 9, which in the assembly position is directed downwards in order to discharge oil from the bearing housing 9.

The oil to be discharged from the bearing housing 9 serves in particular for lubrication and/or cooling of at least one bearing of the shaft 8. In FIG. 3, an oil ring chamber 31 of the bearing housing 9 is shown, which can be supplied with pressurised lubricating oil or cooling oil from the outside via a line 30, in order to lubricate and/or cool the or each bearing of the shaft 8. Such oil, which has been conducted via the or each bearing of the shaft 8, can then be discharged from the bearing housing 9 via the oil drain 26.

To assemble bearing housing 9 and turbine inflow housing 10 and thus the turbocharger 1 on an internal combustion engine, an installation element 27 and 28 respectively acts both on the turbine inflow housing 10 and also on the bearing housing 9 in each case, which in the exemplary embodiment shown in FIG. 2 are formed as in cross section L-shaped installation feet. A first installation element 27 is fastened to the turbine inflow housing 10, namely on the radially outer wall 14 of the turbine inflow housing 10 delimiting the cooling water channel 16, whereas a second installation element 28 is fastened to the bearing housing 9, namely on the radially outer wall 19 of the cooling water channel 17 of the bearing housing 9 delimiting the same. Here, the respective installation element 27, 28 can be assembled on the bearing housing 9 and turbine inflow housing 10 in any circumferential orientation of bearing housing 9 and turbine inflow housing 10 in such a manner that the same projects downwards in order to then assemble the arrangement shown in FIG. 2 upright on an internal combustion engine.

Accordingly, in the case of the turbocharger according to the invention the cooling water channel 17 of the bearing housing 9 is extended into the region of the turbine inflow housing 10 and in sections pulled around the exhaust gas flow duct 12 and the radially inner wall 13 of the turbine inflow housing 10. A separating joint or connection between bearing housing 9 and turbine inflow housing 10 is moved approximately into the region of the axial middle of the exhaust gas flow duct 12 or of the radially inner wall 13 of the turbine inflow housing 10 delimiting the exhaust gas flow duct 12. On the side facing away from the bearing housing 9, a section of the turbine inflow housing 10 follows which likewise provides a cooling water channel 16, namely the cooling water channel 16 of the turbine inflow housing 10, wherein the section of the turbine inflow housing 10 providing the inner wall 13 and the section of the turbine inflow housing 10 providing the cooling water channel 16 of the same are connected to one another on the side facing away from the bearing housing 9. That cooling water section 23 of the cooling water channel 17 of the bearing housing 9, which serves for cooling in the region of the turbine inflow housing 10, is coupled via cooling water-conducting ribs 25 in a cooling water channel section 24 for cooling in the region of the compressor.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A turbocharger, comprising:
   a shaft;
   a turbine configured to expand a first medium, wherein the turbine comprises:
      a turbine housing with a turbine inflow housing, the turbine inflow housing comprises:
         a radially inner wall;
         a radially outer wall;
         a radially middle wall;
         an exhaust gas flow duct delimited by the radially inner wall on a side facing away from the radially middle wall; and
         a cooling water channel of the turbine inflow housing formed between the radially outer wall and a radially middle wall; and
      a turbine rotor;
   a compressor configured to compress a second medium utilising energy extracted in the turbine during expansion of the first medium, wherein the compressor comprises:
      a compressor housing; and
      a compressor rotor coupled to the turbine rotor via the shaft;
   a bearing housing arranged between and connected to the turbine housing and the compressor housing, wherein the bearing housing, seen in axial direction, extends into a region of the radially inner wall of the turbine inflow housing;
   a cooling water channel provided by the bearing housing that surrounds the radially inner wall radially outside and the exhaust gas flow duct of the turbine inflow housing in an axial region, with which the bearing housing extends as far as into the region of the radially inner wall; and
   a channel bounded on a radially inner side by the radially inner wall and bounded radially on an outer side by the radially middle wall and a radially inner wall of the cooling water channel provided by the bearing housing, the channel is fluidically connected to the turbine to receive the first medium, wherein the channel does not conduct the first medium to the turbine rotor.

2. The turbocharger according to claim 1,
   wherein the bearing housing, seen in the axial direction, extends to an axial middle of the exhaust gas flow duct into the region of the turbine inflow housing and, seen in the axial direction, the bearing housing is connected in the region of the axial middle of the exhaust gas flow duct, to a section of the turbine inflow housing providing the radially outer wall and the radially middle wall.

3. The turbocharger according to claim 1,
   wherein the turbine inflow housing comprises a section providing the radially inner wall, a section providing the radially outer wall and the radially middle wall,
   wherein the section providing the radially inner wall and the section providing the radially outer wall and the radially middle wall are connected at an end facing away from the bearing housing.

4. The turbocharger according to claim 1, wherein the cooling water channel provided by the bearing housing comprises a first cooling water channel section surrounding the radially inner wall of the turbine inflow housing radially on the outside and a second cooling water channel section facing the compressor housing.

5. The turbocharger according to claim 1, further comprising:
   an installation element for the turbine inflow housing that is fastened to the radially outer wall of the turbine inflow housing delimiting the cooling water channel of the turbine inflow housing.

6. The turbocharger according to claim 1, further comprising:
   an installation element for the bearing housing that is fastened to a radially outer wall of the bearing housing delimiting the cooling water channel of the bearing housing.

7. A turbocharger, comprising:
   a shaft;
   a turbine configured to expand a first medium, wherein the turbine comprises:
      a turbine housing with a turbine inflow housing the turbine inflow housing comprises:
         a radially inner wall;
         a radially outer wall;
         a radially middle wall;
         an exhaust gas flow duct delimited by the radially inner wall on a side facing away from the radially middle wall; and
         a cooling water channel of the turbine inflow housing formed between the radially outer wall and a radially middle wall; and
      a turbine rotor;
   a compressor configured to compress a second medium utilising energy extracted in the turbine during expansion of the first medium, wherein the compressor comprises:
      a compressor housing; and
      a compressor rotor coupled to the turbine rotor via the shaft;
   a bearing housing arranged between and connected to the turbine housing and the compressor housing, wherein the bearing housing, seen in axial direction, extends into a region of the radially inner wall of the turbine inflow housing; and
   a cooling water channel provided by the bearing housing that surrounds the radially inner wall radially outside and the exhaust gas flow duct of the turbine inflow housing in an axial region, with which the bearing housing extends as far as into the region of the radially inner wall,
   wherein the cooling water channel provided by the bearing housing comprises a first cooling water channel section surrounding the radially inner wall of the turbine inflow housing radially on the outside and a second cooling water channel section facing the compressor housing,
   wherein the first cooling water channel section and the second cooling water channel section are each formed annularly circumferentially in circumferential direction, wherein the first cooling water channel section and the second cooling water channel section are coupled via cooling water-conducting ribs of the bearing housing.

8. The turbocharger according to claim 7, wherein the cooling water-conducting ribs, starting out from the first cooling water channel section, converge in a direction of the second cooling water channel section.

\* \* \* \* \*